July 26, 1966 L. BRADT 3,262,397
DRAGLINE MATERIAL HANDLING TRUCK
Filed June 5, 1964 2 Sheets-Sheet 1

INVENTOR
LYNN BRADT
BY
ATTORNEYS

INVENTOR
LYNN BRADT

BY Seidel & Gonda

ATTORNEYS

United States Patent Office 3,262,397
Patented July 26, 1966

3,262,397
DRAGLINE MATERIAL HANDLING TRUCK
Lynn Bradt, Easton, Pa., assignor to SI Handling Systems, Inc., Easton, Pa., a corporation of Pennsylvania
Filed June 5, 1964, Ser. No. 372,939
10 Claims. (Cl. 104—88)

This invention relates to a dragline material handling truck and, more particularly, to a dragline material handling truck having an upright tow pin supported thereby and adapted to enter a main slot for cooperation with a driving mechanism whereby the truck will be propelled along the slot.

Dragline material handling trucks have been proposed heretofore. Thus, see Patents 2,619,370 and 3,103,895 which are exemplary of trucks corresponding to the type of truck to which the present invention applies. In each of said patents, there is illustrated a dragline material handling truck having an accumulation bumper which can be actuated to cause the tow pin to be raised a predetermined distance.

In the last-mentioned patent, for example, there is illustrated selector or trip rods which are adapted to contact abutments and effect rotation of a support member about an axis extending horizontally transversely across the truck body. Such rotation is utilized to effect a raising of the tow pin, thereby interrupting the contact between the tow pin and the dog on the dragline. Thereafter, the truck may be directed from the main slot into a shunt slot.

The selector or trip rods are suspended from the support member in a manner whereby they may be readily transposed and supported at various positions along the length of the support member. Also, the lower end of the slector or trip rods are generally spaced from the supporting floor or other surface by a distance of approximately one inch or less.

When it is desired to manually push the truck within a warehouse or other storage area, or to and from a storage area to the main slot, the tow pin has generally been manually raised to a position whereby it may not contact normal abutments or other projecting members on the floor or supporting surface. In accordance with the present invention, the selector rod is structurally interrelated with the tow pin in a manner whereby manual raising of the tow pin to an inoperative position automatically results in raising of the selector rods to a height whereby their lower ends will be spaced from the floor or other supporting surface for a sufficient distance so as to avoid contact between the selector rods and abutments or other projections on the floor or supporting surface. In accordance with one embodiment of the present invention, the tow pin is structurally interrelated with the selector rod by means of a flexible member such as a chain. In accordance with another embodiment of the present invention, the tow pin is structurally interrelated with the selector rod to effect raising of the same by means of a bar which is adapted to be beneath a flange on the selector rod. In accordance with still another embodiment of the present invention, the tow pin is structurally interrelated with the selector rod by means of a bar along which a collar is slidably disposed, and through which collar the selector rod may extend.

It is an object of the present invention to provide a novel dragline material handling truck.

It is another object of the present invention to provide a dragline material handling truck having a tow pin structurally interrelated with a selector rod in a manner whereby manual raising of the tow pin to an inoperative position simultaneously effects raising of the selector rod.

It is another object of the present invention to provide a material handling truck having a tow pin by which it may be propelled and a pair of selector rods structurally interrelated with the tow pin in a manner whereby raising of the tow pin automatically causes the selector rods to be raised a corresponding distance.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
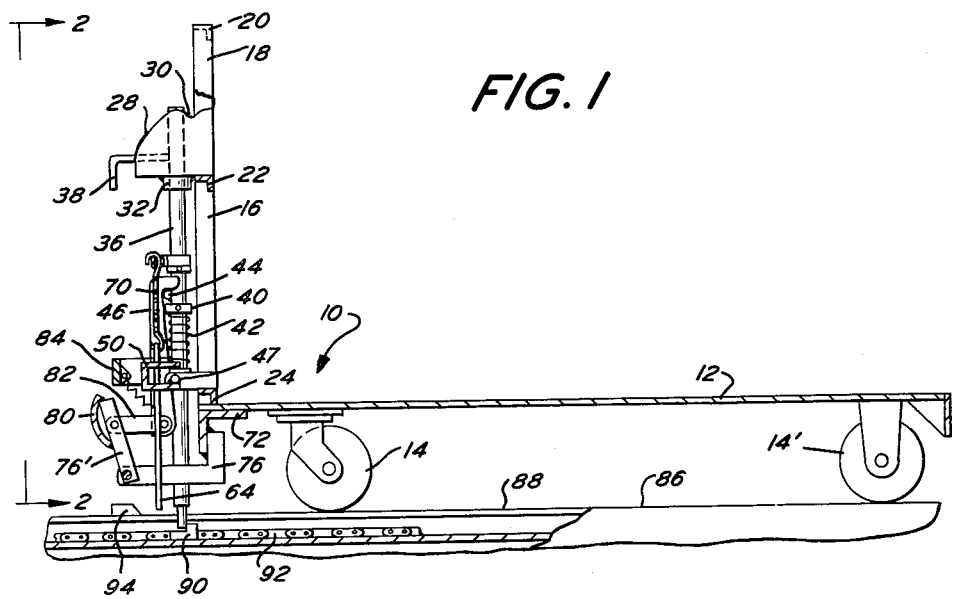
FIGURE 1 is a sectional elevational view of a dragline material handling truck in accordance with one embodiment of the present invention.
Figure 2:
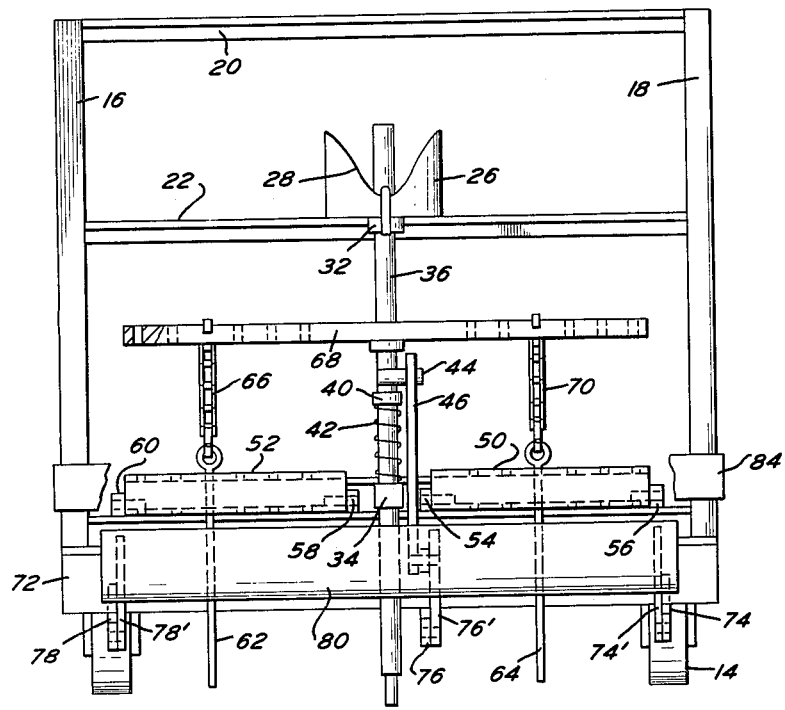
FIGURE 2 is a front elevation view taken along the line 2—2 in FIGURE 1.

Referring to the drawing in detail, wherein like numerals indicate like elements, there is shown in FIGURES 1 and 2 a dragline material handling truck designated generally as 10.

The truck 10 has a body which may assume a wide variety of forms depending upon the material to be transported. In the illustrated embodiment, the body includes a platform 12 mounted on a pair of front wheels 14 and a pair of rear wheels 14'. An upright portion is provided at the front end of the platform 12 and is defined by upright members 16 and 18 interconnected by horizontal struts 20, 22 and 24.

The upright members and the horizontal struts may be of channel-iron configuration. A generally semicircular latch guide plate is supported by the strut 22 equidistant from the side edges of the truck 10. Plate 26 is provided with a contour surface 28 at its upper edge. The contour surface 28 includes a notch 30. As shown more clearly in FIGURE 2, the contour surface 28 is generally V-shaped and the apex of the V is spaced from the notch 30 by a vertical distance of approximately three to three and one-half inches.

A guide sleeve 32 is supported by the plate 26 in line with a guide sleeve 34. Guide sleeve 34 is supported by the strut 24 below guide sleeve 32. Each of the guide sleeves 32 and 34 are equidistant from the side edges of the truck 10. An upright tow pin 36 is provided. Tow pin 36 extends through the guide sleeves 32 and 34 and is provided with a handle 38 which is in engagement with the contour surface 28. A collar 40 is secured to the tow pin 36. A spring 42 surrounds the tow pin 36 and extends from the stationary sleeve 34 to the collar 40 and biases the tow pin 36 upwardly. An abutment 44 is provided on the tow pin 36. A hook arm 46 extends above the abutment 44 and is mounted for rotation about the horizontal axis of pivot pin 47. The tension in the spring 42 is only sufficient to raise the tow pin 36 through a distance of one to two inches when the abutment 44 is not blocked by the hook arm 46.

A pair of C-shaped members 50 and 52 is rotatably supported about an axis extending transversely across the front of the truck 10. Members 50 and 52 are rotatably supported forwardly of the upright portion on the body of the truck 10. Members 50 and 52 are structurally interrelated with the hook arm 46 by a toggle mechanism, as illustrated more clearly in Patent 3,094,944. In order to facilitate rotation of the member 50, it is provided with bearings 54 and 56. Member 52 is provided with bearings 58 and 60.

A selector or trip rod 62 extends through aligned holes in the member 52. A selector or trip rod 64 extends through aligned holes in the member 50. The selector rods 62 and 64 are identical and have a ring at their upper ends. A bar 68 extends horizontally across a front portion of the truck 10 and is connected to the tow pin 36.

A flexible member such as chain 66 has one end removably connected to the ring on the selector rod 62. The other end of the chain 66 is adapted to be removably coupled to one of the holes in the bar 68. Trip rod 64 is similarly coupled to the bar 68 by means of a chain 70.

An angle iron 72 is secured to the platform 12 at the front end thereof. Brackets 74, 76 and 78 project forwardly of the angle iron 72. One end of a link 74' is pivotably connected to the bracket 74. One end of a link 76' is pivotably connected to the bracket 76. One end of a link 78' is pivotably connectted to the bracket 78.

An accumulation bumper 80 is fixedly secured to the other end of each of the links 74', 76' and 78'. One end of a link 82 is pivotably connected to the link 76'. The other end of the link 82 is pivotably connected to a portion of the hook arm 46 below the pin 47. The truck 10 is provided with a pushing bumper 84. A spring is provided as illustrated in FIGURE 1 extending from the bumper 84 to the hook arm 46 for biasing the hook arm 46 to the position illustrated in FIGURE 1.

The truck 10 is adapted to roll along the floor or other supporting surface 86. The floor 86 is provided with a main slot 88 which is intersected at spaced points by shunt slots as is well-known to those skilled in the art. The lowermost end of the tow pin 36 extends through the main slot to a point whereby it may be engaged by a dog 90 on a dragline 92. One or more abutments 94 are provided on the floor 86 for contact with the selector rods. The specific truck illustrated in FIGURES 1 and 2 forms no part of the present invention and is set forth merely to illustrate the environment in which the present invention may be utilized. Thus, when it is desired to move the truck 10 by manually pushing the same, it is undesirable to have the tow pin 36 in the position illustrated in FIGURE 1. Thus, a worker would manually raise the handle 38 and rotate the tow pin until the handle 38 is received within the notch 30. As a result of the structural interrelationship between the tow pin 36 and the selector rods, the latter will also be raised through a similar distance. Accordingly, the selector rods will not be in a position whereby they may contact abutments or other projections when the tow pin 36 is in its inoperative position. The selector rod need not be mounted for rotation about a horizontal axis extending transversely across the truck in accordance with the present invention.

While the selector rods are adapted for simultaneous movement in an upward or downward direction with movement of the tow pin 36, it should be clear that the selector rods are capable of having independent movement in a similar direction. Thus, it is often desirable to change the position of the selector rods with respect to the members 50 and 52. This may be readily accomplished by unhooking the chain 66 or chain 70 from the bar 70 and manually raising the selector rods and replacing them at a different position along the length of the members 50 or 52.

Figure 3:
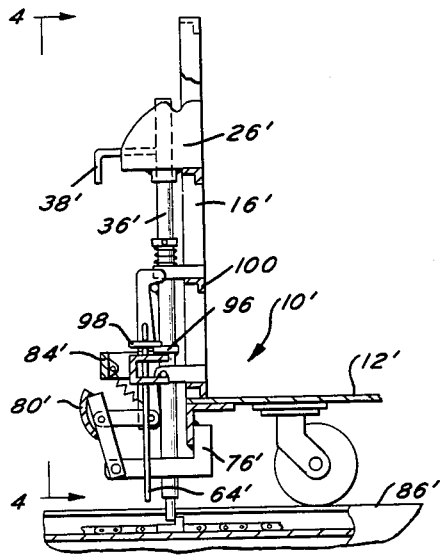
FIGURE 3 is a partial side elevational view of a front end of a truck in accordance with another embodiment of the present invention.
Figure 4:
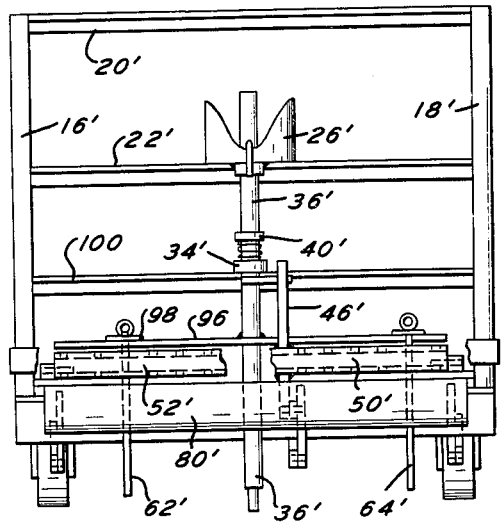
FIGURE 4 is a front elevation view taken along the line 4—4 in FIGURE 3.

In FIGURES 3 and 4, there is illustrated another truck in accordance with the present invention designated generally as 10'. The truck 10' is identical with the truck 10 except as will be made clear hereinafter. Accordingly, corresponding elements are provided with corresponding primed numerals.

In the truck 10', the bar 96 which is fixedly secured to the tow pin 36' is disposed at a level which is lower than the level of the bar 68. Thus, it will be noted that the bar 96, which is preferably flatter than bar 68, is close to the uppermost surface of the member 50'. The sleeve 34' is supported by a strut 100 extending between the upright members 16' and 18'.

The selector rods 62' and 64' are each provided with a radially outwardly directed flange 98 adjacent the ring at their upper end. The flange 98 overlies the bar 96. Accordingly, when the tow pin 36' is manually raised to an inoperative position as described above, the bar 96 will move therewith and cause the selector rod or rods, as the case may be, to also move upwardly through a corresponding distance. The presence of the bar 96 below the plane of the flange 98 does not interfere with the ability of the selector rod to be independently raised and moved to a different location along the length of the member 50'. In view of the above description with respect to truck 10, a further description of truck 10' is not deemed necessary.

Figure 5:
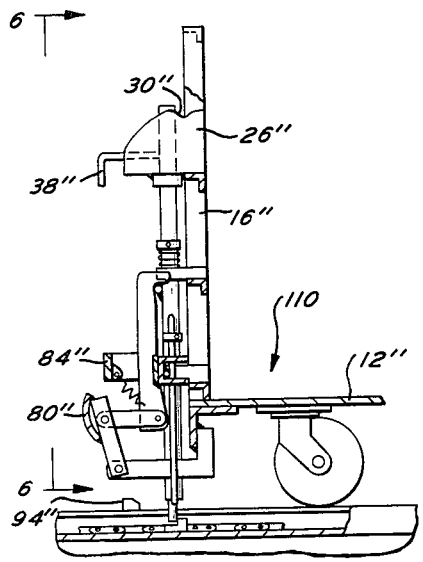
FIGURE 5 is a view similar to FIGURE 3 but illustrating another embodiment of the present invention.
Figure 6:
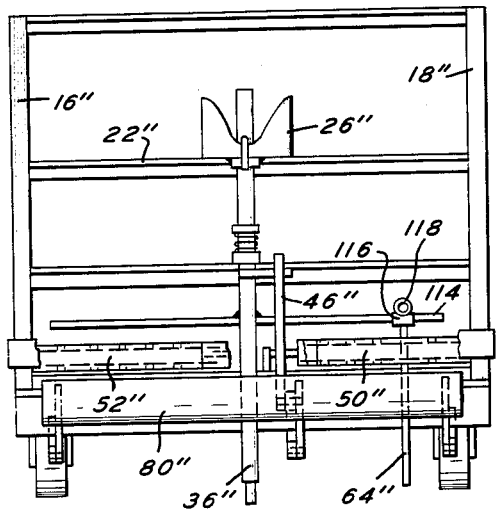
FIGURE 6 is a front elevation view taken along the line 6—6 in FIGURE 5.
Figure 7:
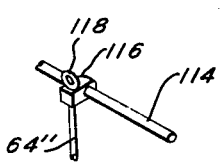
FIGURE 7 is a partial perspective view illustrating the relationship between a selector rod and a supporting bar in the embodiment of FIGURES 5 and 6.

In FIGURES 5–7, there is illustrated another truck designated generally as 110. Truck 110 is identical with truck 10 except as will be made clear hereinafter. Accordingly, corresponding elements are provided with corresponding double primed numerals on the truck 110.

On truck 110, a bar 114 is provided. Bar 114 extends horizontally across a front portion of the truck 110 and is fixedly secured to the tow pin 36''. A collar 116 is slidably supported by the bar 114. Collar 116 has a hole extending therethrough. Selector rod 64'' is adapted to extend through the hole in collar 116. The ring 118 at the upper end of rod 64'' rests on the collar 116.

When the tow pin 36'' is manually raised from the position illustrated in FIGURES 5 and 6 to an inoperative position wherein the handle 38'' is supported within the notch 30'', the bar 114 and collar 116 are also raised through a corresponding distance. Likewise, the selector rod 64'' will be raised through a corresponding distance. At any time, when it is desired to change the position of the selector rod 64'', it may be manually raised until its lowermost end clears the member 50'', and then moved together with its collar 116 to the desired position. Thereafter, the selector rod 64'' will be lowered so that it extends through the selected aligned holes in the member 50''.

The members 50, 50', 52 and 52' on trucks 10 and 10' were rotatably supported. In truck 110, the members 50'' and 52'' are stationary. Accordingly, the abutment 94'' is of the type which is adapted to be moved by contact between a cam surface thereon and the lowermost end of rod 64''. If desired, abutment 94'' may be of the type disclosed in Patent 3,103,183 wherein the abutment 58 controls a switch plate 44. Thus, the selector rod need not cause vertical movement of the tow pin but instead may be of the type which initiates a switching of the truck from movement along a main slot to movement along a shunt slot. The initiation of switching may be in any manner well known to those skilled in the art, such as by operation of a floor mounted proximity switch, by actuation of a movable floor mounted abutment such as in the above-mentioned Patent No. 3,103,895, or by movement of a switching element on the truck, as in Patent No. 3,174,439. In view of the above description with respect to the truck 10, it is not deemed necessary to further describe the truck 110.

In each of the embodiments of the present invention, there is provided a structural interrelationship between the tow pin and the selector rods whereby the rods are caused to move upwardly in response to upward movement of the tow pin. Further, the selector rods are supported in a manner whereby they may be independently moved upwardly thereby facilitating changing of the position of the selector rods along a horizontal axis extending transversely across the truck.

The present invention may be embodied in other specific forms without departing from the spirit or essential attributes thereof and, accordingly, reference should be made to the appended claims, rather than to the foregoing specification as indicating the scope of the invention.

It is claimed:

1. A material handling truck comprising a body, an upright tow pin supported by said body at one end thereof, means supporting at least one selector rod at said one end for rotation about a horizontal axis extending transversely across said body, means for raising said tow pin to an inoperative position, and means coupled to said rod and tow pin for raising said rod through a corresponding distance.

2. A material handling truck comprising a body, wheels supporting said body for rolling movement on a floor, an upright tow pin supported by said body at a front end thereof, said tow pin being movable between operative and inoperative positions, the lower end of said tow pin in its operative position being lower than the wheels, means supporting at least one selector member at said one end of said body and to one side of said tow pin, and means structurally interrelating said two pin and selector member for causing said selector member to move upwardly when the tow pin is moved upwardly from said operative position.

3. A truck in accordance with claim 2 wherein said selector member is a rod disposed generally parallel to said tow pin, the lower end of said rod being above the lower end of said tow pin in the operative position of said tow pin, and the lower end of said rod being constructed and arranged to initiate actuation of a switch plate.

4. A truck in accordance with claim 2 wherein said last-mentioned means includes a flexible member extending between said selector member and an element fixedly secured to said tow pin.

5. A truck in accordance with claim 2 wherein said last-mentioned means includes an outwardly extending portion on said selector member overlying an element connected with respect to said tow pin.

6. A truck in accordance with claim 2 wherein said last-mentioned means includes a collar adjustably supported by an element fixedly secured to said tow pin so that said collar may be moved to different positions along the length of said element.

7. A material handling truck comprising a body, an upright tow pin supported by said body at one end thereof, means supporting at least one selector rod at said one end, and the lower end of said tow pin being below the plane of said wheels for entry into a guide slot, said tow pin being mounted for up and down movement so that the lower end of the tow pin may be moved upwardly out of a guide slot, the lowermost position of the lower end of the tow pin being below the lowermost position for the lower end of the selector rod means structurally interrelating said tow pin and selector rod for movement in a corresponding direction in response to movement of said tow pin while enabling the selector rod to have independent movement in the same direction.

8. A truck in accordance with claim 7 wherein said last-mentioned means also provides structure for selective movement of the selector rod along a horizontal axis extending across a portion of said body at said one end.

9. A material handling truck comprising a body, an upright tow pin supported by said body at a front end thereof, the lower end of said tow pin being below the plane of said wheels for entry into a guide slot, said tow pin being mounted for up and down movement so that the lower end of the tow pin may be moved upwardly out of a guide slot, the lowermost position of the lower end of the tow pin being below the lowermost position for the lower end of the selector rod means supporting a pair of selector rods in an upright position on said front end of said body, and means structurally interrelating said tow pin and said rods for causing said rods and tow pin to simultaneously move upwardly to an inoperative position.

10. A material handling truck comprising a body, wheels coupled to said body to facilitate movement of said body on a horizontal surface, an upright tow pin supported by said body at one end thereof, means supporting a plurality of spaced substantially parallel selector rods at said one end of said body, said rods being aligned in a row transversely of said body, an elongated bar-like member extending transversely across said body at said one end, said tow pin being coupled to said member, each of said rods being coupled to said member, whereby upward movement of said member will result in upward movement of said rods and tow pin.

References Cited by the Examiner

UNITED STATES PATENTS

| 2,619,370 | 11/1952 | Leger | 104—172 X |
| 3,094,944 | 6/1963 | Bradt et al. | 104—172 |
| 3,103,895 | 9/1963 | Bradt et al. | 104—88 |

ARTHUR L. LA POINT, *Primary Examiner.*

EUGENE G. BOTZ, *Examiner.*

F. W. MONAGHAN, R. A. BERTSCH, *Assistant Examiners.*